UNITED STATES PATENT OFFICE.

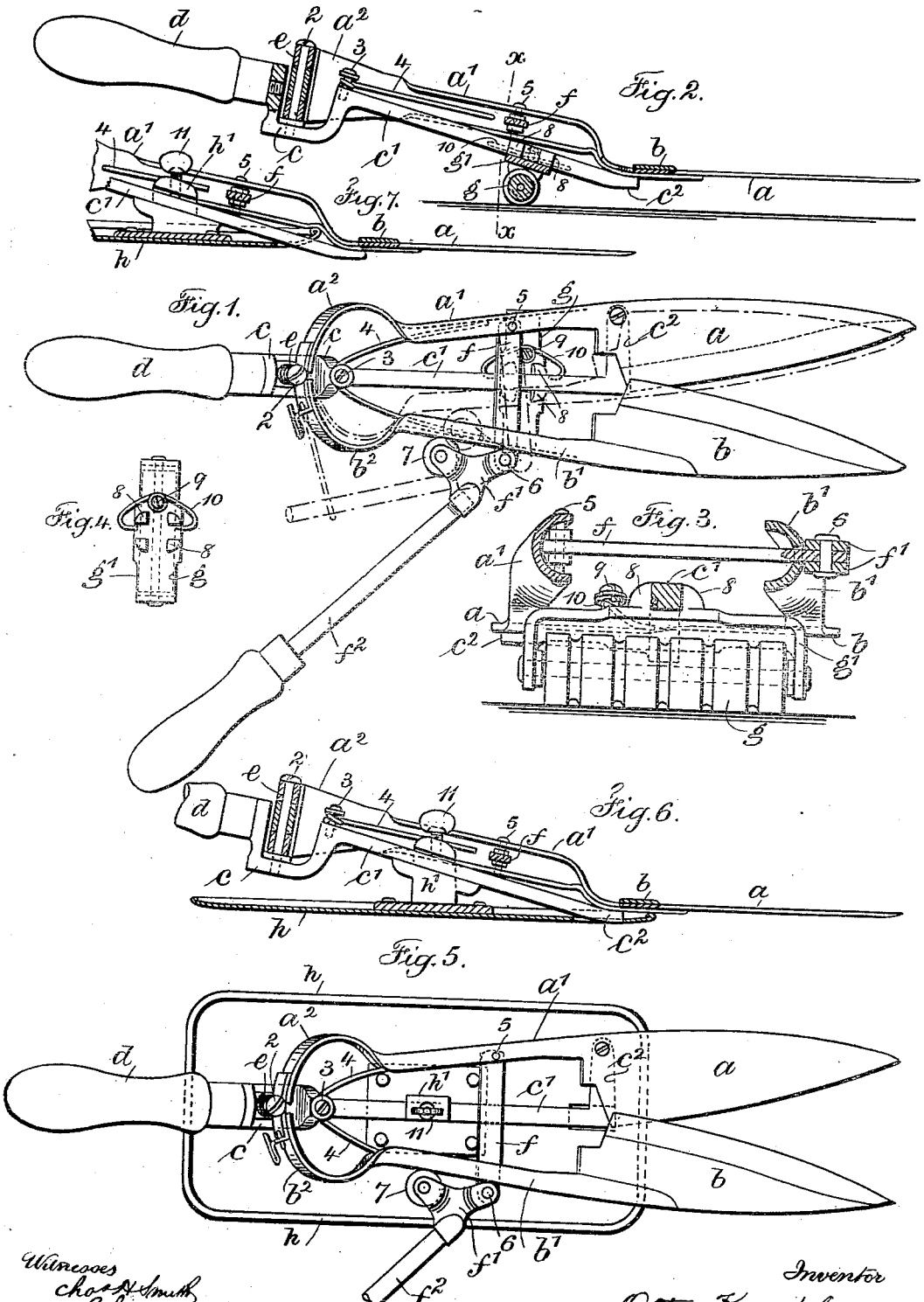
O. KAMPFE.
TRIMMING SHEARS FOR LAWNS, HEDGES, &c.
APPLICATION FILED DEC. 9, 1907.
935,309.
Patented Sept. 28, 1909.

OTTO KAMPFE, OF NEW YORK, N. Y.

TRIMMING-SHEARS FOR LAWNS, HEDGES, &c.

935,309.  Specification of Letters Patent.  Patented Sept. 28, 1909.

Application filed December 9, 1907. Serial No. 405,690.

*To all whom it may concern:*

Be it known that I, OTTO KAMPFE, a citizen of the United States, residing at the borough of Brooklyn, in the county of Kings, city and State of New York, have invented an Improvement in Trimming-Shears for Lawns, Hedges, &c., of which the following is a specification.

My invention relates to improvements in trimming shears for lawns, hedges, etc., and the object of my invention is to provide a simple device operated by both hands and in which the weight of the implement is not supported by the hands but is carried by a means adapted to be moved over the surface supporting the implement.

In the device of my improvement a frame and handle are employed as a foundation for the shears and a lever handle for actuating the same. A part of this frame is a central bar member to the lower free end of which one of the shear blades is permanently fastened.

The essential feature of my invention comprises a device adapted for removable connection with this bar member, the lower surface of which bears upon and is adapted to be moved over the surface supporting the implement. If the shears are for trimming grass this device comes in contact with the ground, and if the shears are for trimming a hedge, then this device comes in contact with the portion of the hedge already trimmed, and in either instance determines the line and level of the surface trimmed.

The device employed for the grass shears has an adjustable relation with the supporting bar so as to control the length of the grass after trimming, all of which is hereinafter more particularly described.

In the drawing Figure 1 is a plan representing the device of my improvement. Fig. 2 is a longitudinal section and elevation of the same. Fig. 3 which is in larger size than Figs. 1 and 2, is a cross section at the dotted line $x$, $x$, of Fig. 2, looking toward the point of the shears. Fig. 4 is a plan view of the device shown in Figs. 1 to 3 inclusive and adapted to bear upon the surface supporting the shears, which in this use on the ground employs a roller as a supporting device. Fig. 5 is a plan and Fig. 6 a partial longitudinal section and elevation representing a form of my invention,—the form particularly adapted for trimming hedges, and Fig. 7 is a partial longitudinal section and elevation representing a slight modification of the form shown in Figs. 5 and 6.

The shears proper is the same in all the figures of the drawing, in which $a$ and $b$ represent the blades of the shears, $a^1$ and $b^1$ the blade arms formed as prolongations from the widest portions of the blades, $a^2$ $b^2$ are the bow backs of the shears which come together by the hinge members $e$ through which passes the pivot post 2.

I provide a frame member as a means of support to the shears which is composed of the following parts:—a U-shaped part $c$, a bar portion $c^1$ and foot piece $c^2$. The bar portion $c^1$ is a prolongation from the upper portion of one limb of the U-shaped part, while the foot piece $c^2$ is a prolongation at right angles from the lower free end of the bar $c^1$; the opposite limb of the U-shaped part $c$ being apertured and internally threaded for connection with the screw stem of the handle $d$ and by which means the parts $c$ $c^1$ $c^2$ and handle $d$ are substantially prolongations the one of the other.

The pivot post 2 of the hinge members $e$ is securely connected to the lower portion of the U-shaped part $c$ and a post 3 is mounted at the point of union of the U-shaped part $c$ and bar $c^1$ and the same acts as a support for the coiled central portion of the wire spring 4 whose free ends bear against the inner surfaces of the substantially semi-circular blade arms $a^1$ $b^1$ of the shears, tending to force the same apart, the turning moment being at the hinged members 3 upon the pivot post 2.

While the bow backs $a^2$ $b^2$ of the shear blades are connected to the frame member, the blade $a$ is also connected by a suitable rivet shown in Figs. 1 and 5, to the free end of the foot piece $c^2$ and its position thus fixed while the blade $b$ is the movable member of the shears. The bar $c^1$ when in use is inclined and occupies substantially an acute angle to the horizontal or ground line and an obtuse angle to the plane of the blades $a$ $b$. For effecting the movement of the shear blades a bar $f$ is connected by a pivot pin 5 to the arm $a^1$ of the shear blade $a$ and the other end of this bar $f$ moves through a mortise in the blade arm $b^1$, and I employ a triangular member $f^1$ pivotally connected at 6 to the bar $f$ and provided with a roller 7 and with a lever handle $f^2$; said roller 7 being adapted to bear upon the outer convex surface of the blade arm $b^1$ so that when the operator with one hand grasps the handle d and with the other hand grasps the lever handle $f^2$ and brings the two parts toward one another, the shears are actuated by the roller 7 held in position by the bar $f$ forcing the blades of the shears $a$ $b$ together.

I do not limit myself to the manner of pivotally connecting the bar $f$ with the blade arm $a^1$ but prefer as shown in Fig. 3 to employ washers at each side of the bar $f$ in the semi-circular recess of this blade arm so as to prevent transverse movement.

The device adapted to be moved over the surface supporting the implement by maintaining the same at a predetermined height above the plane of said supporting surface is in a grass cutting or trimming implement a roller such as the roller $g$ Figs. 1 to 4 inclusive, or a plate having a surface in a true plane as shown in Figs. 5 to 7 inclusive, and adapted for the trimming of a hedge, or for producing a predetermined height in a lawn or border; the former of these devices comprises a roller $g$ which by preference and as shown in Fig. 3 is circumferentially grooved. This roller $g$ is carried by a yoke $g^1$ and the yoke is provided with lugs 8 in pairs to come at opposite sides of the inclined bar $c^1$ and spaced apart in a width agreeing with this bar and they are also adapted to come upon the opposite longitudinal edges of the yoke. A post 9 rises from the yoke and a bow-spring 10 is mounted in the said pin. One surface of the inclined bar $c^1$ is longitudinally curved or channeled so as to receive the free ends of the wire bow-spring 10 when the yoke and its roller are connected to said bar; the said spring serving frictionally to maintain the connected relation of the roller and its yoke with the bar $c^1$ near the groove in the said bar receiving the free ends of the bow-spring, providing for a longitudinal movement along the bar $c^1$ without the risk of separation.

Fig. 2 shows the roller as connected to the bar at a predetermined position for a predetermined height of the cutting blades $a$ $b$ when in a plane parallel to the plane of support. This bow-spring provides sufficient friction to maintain the relation of the roller and its yoke with the bar $c^1$ but upon the application of a reasonable amount of force the said yoke and roller may be slid along this bar so as to come nearer to the shear blades or farther away therefrom so as to regulate the height of the shear blades to the plane of the support; said height being less as this roller is moved toward the handle and greater as this roller is moved toward the shear blades $a$ $b$. This adjustment is gradual and it is all that is required.

Referring now particularly to Figs. 5, 6 and 7, the same characters of reference and the same description apply to parts agreeing with those hereinbefore described except that in these figures I have shown the plate of metal $h$ in an even plane provided with a grooved standard $h^1$. This plate is of rectangular form by preference and with rounded edges and the standard $h^1$ is securely riveted thereto and provided with a groove to receive the bar $c^1$ and the clamping screw 11 to connect the parts so as to prevent the accidental separation from the bar $c^1$ of the plate and its grooved standard. Figs. 5 and 6 show the plane of the under surface of this plate $h$ as slightly below the plane of the shear blades $a$ $b$ while Fig. 7 as a form of the invention, shows the plane of the under side of the plate $h$ and the plane of the under side of the shear blades $a$ $b$ as agreeing, or in other words, both planes in substantially the same common plane produced by notching the front of the plate $h$ so as to receive the entire lower end of the bar $c^1$ and the foot piece $c^2$. This form of my invention is particularly adapted with the shear device for trimming hedges; the said plate acting as a support for the shear mechanism and extending over the surface of the hedge being cut and when bearing truly thereon continuing the trimming of the hedge until an even plane.

The device of my present invention is essentially an improvement upon the device of my Letters Patent for lawn trimmers #859,665, granted July 9, 1907, and is especially complementary to the structure of said patent to the extent of showing a device adapted for the support of the shears while traveling over the trimming surface of a lawn or hedge.

I have shown a hook as pivotally connected to the bow back $b^2$ of one shear blade adapted to engage the lever handle $f^2$ and hold the same in the dotted position shown in Fig. 1, which position is the closed position of the shear blades and a position of compactness for packing and transportation.

I claim as my invention:

1. In an implement of the character described and in combination with the shear blades and blade arms, a frame bar set at an obtuse angle to the plane of the shear blades and acting as a support for the same and the blade arms, a device adapted to come between the blade arms and a point of support and means for adjustably connecting the same to and along the said frame bar, whereby the device rests and is adjusted in relation to the surface over which the implement is moved to support the implement during the operation thereof.

2. In an implement of the character described and in combination with the shear blades and blade arms, a frame bar set at an obtuse angle to the plane of the shear blades and acting as a support for the same and the blade arms, a device adapted to come between the blade arm and a point of support, and means connected to said device and arranged to receive the frame bar, and a clamping device connected to said means and for securing the device and the means adjustably to the frame bar whereby the device rests and is adjusted in relation to the surface over which the implement is moved to support the implement during the operation thereof.

3. In an implement of the character described and in combination with the shear blades, blade arms and a frame bar beneath the blade arms and inclined to the plane of the shear blades and acting as a support therefor, of a device adapted to come in contact with a supporting surface directly below such trimming implement, a device connected thereto and arranged to receive the aforesaid frame-bar, and be movable along the same, and means for clamping the device to the frame-bar in an adjustable relation below the blade arms and to such an extent as to prevent accidental movement.

4. In an implement of the character described and in combination with the shear blades, blade arms and a frame bar beneath the blade arms and inclined to the plane of the shear blades and acting as a support therefor, of a roller adapted to come in contact and to rotate over a supporting surface, a yoke member in which the roller is pivotally mounted, means connected to the yoke member and adapted to come at either side of and engage the said frame-bar below the blade arms for guiding the roller and yoke and means associated with said yoke adapted to engage the said frame-bar to prevent accidental displacement thereon of the yoke member and to create a friction on said bar for locating the roller and its yoke.

5. In an implement of the character described, the combination with the shear blades and a longitudinally disposed grooved frame-bar to one end of which one of the said shear blades is permanently connected, of a roller, a yoke in which the roller is pivotally mounted, spaced apart lugs on the upper surface of the yoke adapted to come at each side of the said frame-bar, a pin on the said yoke and a bow-spring connected to the pin and at its free ends adapted to enter the groove of the frame-bar for creating a friction for maintaining the roller and yoke in position on said bar and for providing a longitudinal movement along the bar to regulate the height of the shear blades above the supporting surface.

Signed by me this 19th day of November, 1907.

OTTO KAMPFE.

Witnesses:
GEO. T. PINCKNEY,
BERTHA M. ALLEN.